May 6, 1958  G. G. GREULICH  2,833,390
CONVEYOR SYSTEM
Filed July 18, 1955
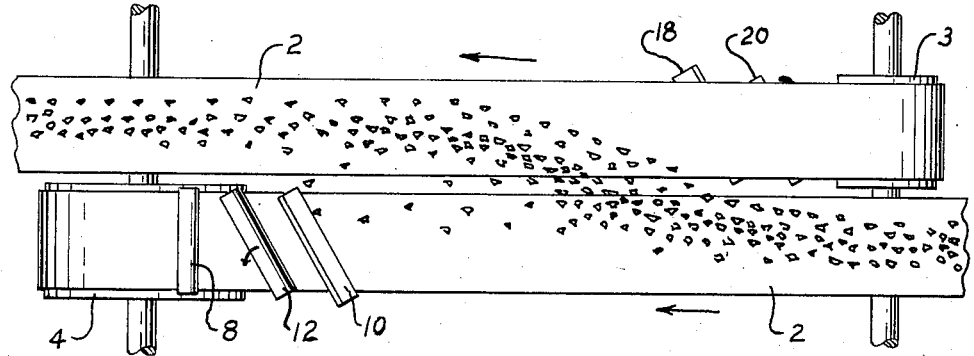
Fig. 1
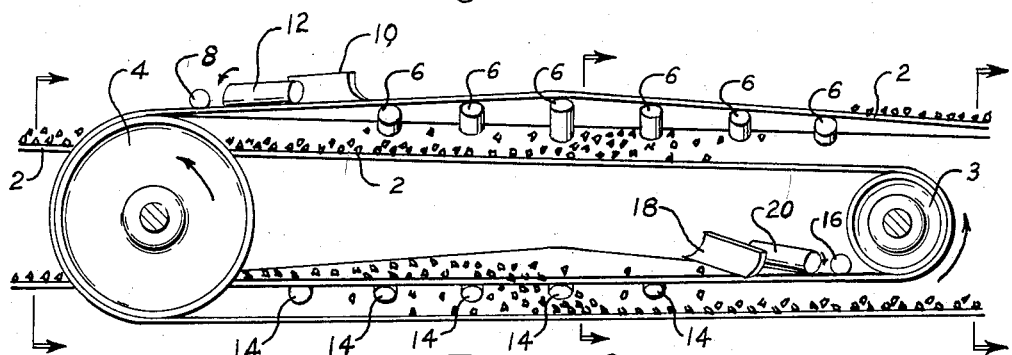
Fig. 2
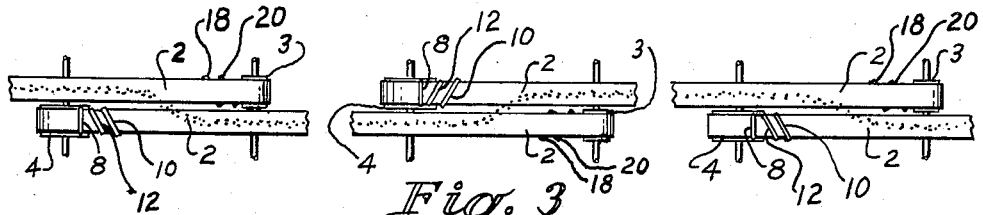
Fig. 3
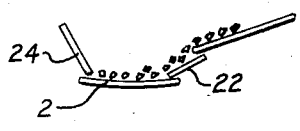
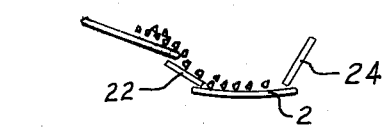
Fig. 5
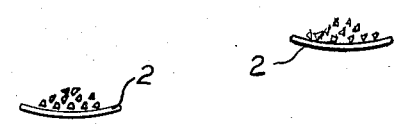
Fig. 4
Fig. 6
INVENTOR
Gerald G. Greulich
BY Robert U. Geil Jr.
ATTORNEY

United States Patent Office 2,833,390
Patented May 6, 1958

2,833,390

CONVEYOR SYSTEM

Gerald G. Greulich, Pittsburgh, Pa.

Application July 18, 1955, Serial No. 522,546

4 Claims. (Cl. 198—20)

This invention relates to conveyor systems, and more particularly to conveyor systems which employ a series of successive endless belts.

It has long been the practice to convey materials of one kind or another along the upper flights of a more or less horizontally disposed series of juxtaposed endless conveyor belts, the respective endless belts being power driven in any suitable manner. With the advent of improved belting materials, it has been feasible to utilize belts of this type for conveying rough substances, such as coal, etc., over long distances.

It is among the objects of the present invention to provide a novel and improved conveyor system which utilizes a series of successively disposed endless conveyor belts, but wherein the feed-off end of one endless belt overlaps with the feed-on end of the next succeeding endless belt.

Another object is the provision of a series of successive endless conveyor belts disposed in the manner immediately aforesaid, together with means for effecting the transfer of materials from one endless belt to another.

Still another object is the provision of a novel conveyor system of the type described which operates efficiently, yet is comparatively simple and inexpensive.

Still another object is the attainment of the foregoing while utilizing both the upper and lower flights of the endless conveyor belts.

The invention, then, comprises the features hereinafter fully described and as particularly pointed out in the claims, the following description and the annexed drawings setting forth in detail certain illustrative embodiments of the invention, these being indicative of one of several ways in which the principles of the invention may be employed.

In said drawings:

Figure 1 is a fragmentary plan view, illustrating a conveyor system embodying the teachings of the present invention, the upper portion of said figure representing the material feed-on end of one end of one endless belt, and the lower portion thereof representing the material feed-off (or discharge) end of a preceding endless belt;

Figure 2 is a side elevational view of the showing of Figure 1;

Figure 3 is a composite view, on a reduced scale, of a series of successively disposed endless conveyor belts, the upper central and upper right-hand portions of this figure fragmentarily illustrating the upper flight of a complete endless belt, and the lower central and lower left-hand portions fragmentarily illustrating a second complete endless belt;

Figure 4 is a view taken from the left-hand end of Figure 2, as indicated by the arrows thereat, and illustrating an endless belt 2 carrying materials on its upper and lower flights at a position relatively adjacent its smaller pulley 3;

Figure 5 is a view taken from a position adjacent the middle of Figure 2, and illustrating the upper and lower flights of a conveyor belt which is being canted for the discharge of materials at a position adjacent its larger pulley 4; and Figure 6 is a view illustrating the conveyor belt of Figure 1 after it has been moved into normal position after having been canted in the manner of Figure 5.

Referring more particularly to the drawings, the numeral 2 designates, in each instance, a more-or-less horizontally disposed endless conveyor belt, the ends of which are supported by pulleys 3 and 4; and, as stated hereinbefore, the teachings of the present invention contemplate the arrangement of a series of such endless belts (and pulleys) in staggered and end-overlapping relationship.

As shown most clearly in Figure 2, the pulley 4 of each of the successively disposed (and end-overlapping) endless belts 2 is of substantially greater diameter than its cooperating pulley 3; and these larger pulleys are disposed most nearly adjacent the smaller pulley 3 of the next succeeding endless conveyor belt.

It will be understood by those skilled in the art that one, or both, of the pulleys of each endless belt may be driven by any suitable means which, as such, forms no part of the present invention, and, accordingly, is neither disclosed herein nor specifically referred to hereinafter.

Assuming that the axes of rotation of each of the pulleys 3 and 4 occupy substantially a common plane, when the conveyor belts are all moved in the same direction, as indicated by the directional arrows in Figure 1, material on the upper surface of the upper flight of a given conveyor belt will, in its forward movement, continuously move in a slightly upward direction from the smaller pulley (3) to the larger pulley (4); and, this is, of course, also true of the material moving in the opposite direction on the upper surface of the lower flight of the same endless belt.

Referring to Figure 2, the underside of the upper flight of the feed-off end of each of the conveyor belts 2 is gradually tilted in a direction toward the (lower) feed-on end of the next successive endless belt by a short series of rollers 6 whose axes are progressively inclined upwardly toward the next feed-off position and then gradually brought back to the normal position. This return to the normal conveying position is assisted by a roller 8 which is disposed in contact with the upper surface of the upper flight of the conveyor belt 2 at a position which is adjacent the large pulley 4. In order to prevent the material being conveyed from passing under this roller 8, a scraper blade 10 is provided, the same extending transversely and toward the next successive conveyor belt at an angle of approximately 45°. And between the scraper blade 10 and the roller 8, there is provided a rotary brush 12 which is rotated by any suitable means in a direction which is opposite the direction of rotation of the pulley 4.

A series of rollers 14 are provided beneath, and in contact with, the lower flight of each of the endless belts 2 at a position which is closely adjacent the smaller pulley 3; that is to say, immediately below the feed-on position of the upper flight of the said belt. Accordingly, this portion of the lower flight of each of the endless belts 2 constitutes the feed-off point; and the rollers 14 are axially inclined in the manner of the aforementioned roller 6.

In order to assist the return of the lower flight of the endless conveyor belts to their normal conveying positions, immediately prior to making contact with the smaller pulleys 3, each of the said belts is provided with a roller 16 which contacts the upper surface of the lower flight of the said belt. Between these rollers 16 and the feed-off position of the lower flights of the belts, there is provided, in succession, an inclined scraper blade 18 and counter-rotating cleaning brush 20. In addition, the feed-off of the materials from the upper and lower flights of the respective endless belts 2 onto the corresponding flight of the next adjacent conveyor is assisted by a deflector plate 22; and on the opposite side of the belts onto which the material is being fed, there is a baffle 24 to prevent overflow.

As hereinbefore mentioned, the novel and improved results of the conveyor system of the present invention are obtained not only by the end-overlapping arrangement of the successively disposed belts, but also by the arrangement of the smaller and larger pulleys 3 and 4 in such manner that, whether the material is moving from right to left on the upper flights, or from left to right on the lower flights, the feed-off points are always lower than the feed-on points.

As will be understood by those skilled in the art, each of the successively disposed endless belts 2 is supported intermediate its pulleys 3 and 4 by the usual idler rollers (not shown).

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A conveyor system comprising, in combination, a pair of substantially horizontal endless conveyor belts adapted for conveying movement in the same direction, said endless belts being parallel and longitudinally staggered with respect to each other, the looped ends of each of said endless conveyor belts being supported by a spaced pair of pulleys of different diameter, the axes of all of the pulleys of both of said endless conveyor belts occupying substantially the same plane, the larger pulley for one endless conveyor belt being disposed more adjacent the smaller pulley for the other endless conveyor belt, means for transferring materials from the highest of the upper flights of said endless conveyor belts at a point which is relatively adjacent its larger pulley onto the upper flight of the other endless conveyor at a point which is relatively adjacent its smaller pulley, and means substantially below said last-named means for transferring materials from the highest of the lower fights of said endless conveyor belts onto the lower flight of the other endless conveyor belt.

2. A conveyor system comprising, in combination, a pair of substantially horizontal endless conveyor belts adapted for conveying movement in the same direction, said endless belts being parallel and longitudinally staggered with respect to each other, the looped ends of each of said endless conveyor belts being supported by a spaced pair of pulleys of different diameter, the axes of all of the pulleys of both of said endless conveyor belts occupying substantially the same plane, the larger pulley for one endless conveyor belt being disposed more adjacent the smaller pulley for the other endless conveyor belt, belt-canting means for transferring materials from the highest of the upper flights of said endless conveyor belts at a point which is relatively adjacent its larger pulley onto the upper flight of the other endless conveyor at a point which is relatively adjacent its smaller pulley, and means substantially below said last-named means for transferring materials from the highest of the lower flights of said endless conveyor belts onto the lower flight of the other endless conveyor belt.

3. A conveyor system comprising, in combination, a pair of substantially horizontal endless conveyor belts adapted for conveying movement in the same direction, said endless belts being parallel and longitudinally staggered with respect to each other, the looped ends of each of said endless conveyor belts being supported by a spaced pair of pulleys of different diameter, the axes of all of the pulleys of both of said endless conveyor belts occupying substantially the same plane, the larger pulley for one endless conveyor belt being disposed more adjacent the smaller pulley for the other endless conveyor belt, means for transferring materials from the highest upper flight of said endless conveyor belts at a point which is relatively adjacent its larger pulley onto the upper flight of the other endless conveyor at a point which is relatively adjacent its smaller pulley, and belt-canting means substantially below said last-named means for transferring materials from the highest lower flight of said endless conveyor belts onto the lower flight of the other endless conveyor belt.

4. A conveyor system comprising, in combination, a pair of substantially horizontal endless conveyor belts adapted for conveying movement in the same direction, said endless belts being parallel and longitudinally staggered with respect to each other, the looped ends of each of said endless conveyor belts being supported by a spaced pair of pulleys of different diameter, the axes of all of the pulleys of both of said endless conveyor belts occupying substantially the same plane, the larger pulley for one endless conveyor belt being disposed more adjacent the smaller pulley for the other endless conveyor belt, belt-canting means for transferring materials from the highest upper flight of said endless conveyor belts at a point which is relatively adjacent its larger pulley onto the upper flight of the other endless conveyor at a point which is relatively adjacent its smaller pulley, and belt-canting means substantially below said last-named means for transferring materials from the highest lower flight of said endless conveyor belts onto the lower flight of the other endless conveyor belt.

References Cited in the file of this patent

UNITED STATES PATENTS

| | | |
|---|---|---|
| 389,242 | Palmer | Sept. 11, 1888 |
| 1,093,815 | Whittier | Apr. 21, 1914 |
| 1,123,999 | Dupuy | Jan. 5, 1915 |
| 1,959,238 | Horsfield | May 15, 1934 |